(12) United States Patent
Henry

(10) Patent No.: US 7,164,488 B2
(45) Date of Patent: *Jan. 16, 2007

(54) FAX-TO-EMAIL AND EMAIL-TO-FAX COMMUNICATION SYSTEM AND METHOD

(75) Inventor: Matthew K. Henry, San Francisco, CA (US)

(73) Assignee: MongoNet, San Francisco, CA (US)

( * ) Notice: Subject to any disclaimer, the term of this patent is extended or adjusted under 35 U.S.C. 154(b) by 166 days.

This patent is subject to a terminal disclaimer.

(21) Appl. No.: 10/155,808

(22) Filed: May 24, 2002

(65) Prior Publication Data

US 2002/0191227 A1  Dec. 19, 2002

Related U.S. Application Data

(63) Continuation of application No. 09/537,820, filed on Mar. 28, 2000, now Pat. No. 6,424,426.

(51) Int. Cl.
*H04N 1/00* (2006.01)

(52) U.S. Cl. .................. 358/1.15; 358/407; 358/402; 358/1.15; 358/1.12; 358/1.13; 358/1.14

(58) Field of Classification Search ............... 358/1.15, 358/407, 402, 440, 448, 1.12, 1.13, 1.14; 379/100.07, 100.08, 100.09, 100.15, 100.17

See application file for complete search history.

(56) References Cited

U.S. PATENT DOCUMENTS

| 4,893,333 A | 1/1990 | Baran et al. |
| 5,115,326 A | 5/1992 | Burgess et al. |
| 5,193,110 A | 3/1993 | Jones et al. |
| 5,247,591 A * | 9/1993 | Baran .......................... 382/179 |
| 5,339,156 A | 8/1994 | Ishii |
| 5,386,297 A | 1/1995 | Tanaka et al. |
| 5,461,488 A | 10/1995 | Witek |
| 5,513,254 A | 4/1996 | Markowitz |
| 5,515,176 A | 5/1996 | Galen et al. |
| 5,767,985 A | 6/1998 | Yamamoto et al. |
| 5,790,639 A | 8/1998 | Ranalli et al. |
| 5,841,550 A | 11/1998 | Johnson |
| 5,848,413 A | 12/1998 | Wolff |
| 5,873,077 A | 2/1999 | Kanoh et al. |
| 5,881,233 A | 3/1999 | Toyoda et al. |
| 6,009,150 A | 12/1999 | Kamel |
| 6,014,502 A | 1/2000 | Moraes |
| 6,020,980 A * | 2/2000 | Freeman ...................... 358/402 |
| 6,023,345 A | 2/2000 | Bloomfield |
| 6,025,931 A * | 2/2000 | Bloomfield .................. 358/402 |

(Continued)

FOREIGN PATENT DOCUMENTS

EP   0465011 A   1/1992

(Continued)

OTHER PUBLICATIONS

Emert, "Web Ad Spending Passes Outdoor Medium," San Francisco, Chronicle, May 4, 1999.

(Continued)

*Primary Examiner*—Kimberly Williams
*Assistant Examiner*—Andrew Lam
(74) *Attorney, Agent, or Firm*—Townsend and Townsend and Crew LLP

(57) ABSTRACT

A facsimile/email communication system and method providing a user the ability to send emails from any standalone facsimile machine and providing a user the ability to logon to a centralized web server and send facsimiles to any standalone fax machine.

20 Claims, 8 Drawing Sheets

U.S. PATENT DOCUMENTS

| | | | |
|---|---|---|---|
| 6,061,502 A * | 5/2000 | Ho et al. | 358/1.15 |
| 6,101,244 A * | 8/2000 | Okada | 379/100.08 |
| 6,104,500 A * | 8/2000 | Alam et al. | 358/1.15 |
| 6,124,939 A * | 9/2000 | Toyoda et al. | 358/1.15 |
| 6,157,706 A * | 12/2000 | Rachelson | 379/100.08 |
| 6,266,160 B1 * | 7/2001 | Saito et al. | 358/407 |
| 6,356,356 B1 * | 3/2002 | Miller et al. | 358/1.15 |
| 6,374,246 B1 | 4/2002 | Matsuo | |
| 6,424,426 B1 * | 7/2002 | Henry | 358/1.15 |
| 6,594,032 B1 | 7/2003 | Hiroki et al. | |
| 6,600,750 B1 * | 7/2003 | Joffe et al. | 370/401 |
| 6,614,551 B1 * | 9/2003 | Peek | 358/1.15 |
| 6,625,642 B1 * | 9/2003 | Naylor et al. | 709/206 |
| 6,650,440 B1 * | 11/2003 | Wing | 358/402 |
| 6,707,580 B1 * | 3/2004 | Bloomfield | 358/402 |
| 6,781,721 B1 | 8/2004 | Toyoda et al. | |
| 6,801,546 B1 | 10/2004 | Yoshida et al. | |
| 6,826,625 B1 * | 11/2004 | Fujise et al. | 709/246 |
| 6,914,693 B1 * | 7/2005 | Kirkeby | 358/1.15 |

FOREIGN PATENT DOCUMENTS

| | | |
|---|---|---|
| WO | WO96/41463 A | 12/1996 |
| WO | WO98/53603 A | 11/1998 |
| WO | WO99/56459 | 11/1999 |
| WO | WO 00/05654 | 2/2000 |
| WO | WO00/78035 A | 12/2000 |

OTHER PUBLICATIONS

Ferguson, "The technology that won't die," Forbes, Apr. 5, 1999.

Lieberman, "Panasonic Machine Sends Faxes over the Internet," Computer Peripherals, Electronic Engineering Times, Nov. 10, 1997. Net Returns, "All for One and One for All," The Industry Standard. Aug. 16-23, 1999, p. 120.

Liebmann, Market Foxus: Fax Over IP, "As long distance rates drop, IP fax vendors lose their advantage over traditional faxing. But with a bit of redefinition and value adding, the vendors are sticking around, --Rethinking IP Fax" Network Magazine, pp. 70-74.

Newsome, "Some Facts On Free Online Fax Service," Inv. Bus. Daily Jul. 2, 1999.

Norr, "The Pitch for Free Internet Fax Services," San Francisco Chronicle, Apr. 1, 1999.

* cited by examiner

Use capital (uppercase) letters. Handprint each letter, number and symbol as in the sample below:

| A | B | C | D | E | F | G | H | I | J | K | L | M | N | O | P | Q | R | S | T | U |
|---|---|---|---|---|---|---|---|---|---|---|---|---|---|---|---|---|---|---|---|---|
| V | W | X | Y | 1 | 2 | 3 | 4 | 5 | 6 | 7 | 8 | 9 | 0 | @ | _ | - | . | # | | |

To: (Write e-mail address here, keep each letter in the center of the box and use dark ink)

Cc: (optional second e-mail address)

Cc: (optional third e-mail address)

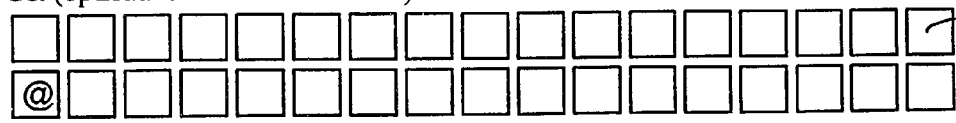

Freehand Notes and Drawings:

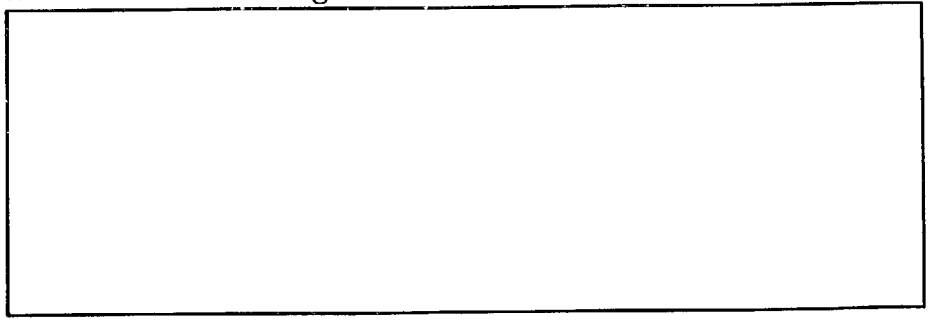

Traffic and weather ☐   map ☐   movies ☐   restaurants ☐   stocks ☐   news ☐

FIG. 4.

MongoFax Confirmation Page:

Your transmission was sent to the following e-mail address(es) or fax number(s)
E-Mail: john_doe@generic.com
E-Mail: jane_doe@generic.com
Fax #: (415) 555.5555

If any of these addresses or fax numbers are incorrect,
please carefully fill out a new e-mail
address page and re-send.

_____ Tear along dotted line. _____ Tear along dotted line. _____

Advertisement  Information

FIG. 6.

FAX-TO-EMAIL AND EMAIL-TO-FAX COMMUNICATION SYSTEM AND METHOD

CROSS-REFERENCES TO RELATED APPLICATION

The present application is a continuation application from, commonly assigned U.S. patent application Ser. No. 09/537,820 filed on Mar. 28, 2000, now U.S. Pat. No. 6,424,426 entitled "FAX-TO-EMAIL AND EMAIL-TO-FAX COMMUNICATION SYSTEM AND METHOD" by Henry, the disclosure of which is hereby incorporated by reference in its entirety for all purposes.

COPYRIGHT NOTICE

A portion of the disclosure of this patent document contains material that is subject to copyright protection. The copyright owner has no objection to the xerographic reproduction by anyone of the patent document or the patent disclosure in exactly the form it appears in the Patent and Trademark Office patent file or records, but otherwise reserves all copyright rights.

BACKGROUND OF THE INVENTION

The present invention relates to a facsimile (fax)/electronic mail (email) communication system. More particularly, the present invention provides for, among other things, sending and/or receiving emails, web page downloads and faxes from any standalone fax machine. A web page is a file written in hypertext markup language (HTML) and which is stored on a web server. It may also refer to images that appear as part of the page when it is displayed by a web browser.

Fax images can be moved over the Internet by converting fax signals having a fax format to an email format (e.g. RFC-822). Once the conversion is completed, the email is then transferred over the Internet to the intended destination according to the Simple Mail Transfer Protocol (SMTP) or similar protocol. The Internet is the worldwide network of networks based on the TCP/IP (Transmission Control Protocol/Protocol). Currently, there are various subscriber based service that permit a subscriber to send fax images over the Internet.

According to one type of service, offered by companies such as eFax, Jfax, CallWave and Telebot, a subscriber is provided with a unique telephone number. Any documents faxed to that number are converted to email format and transferred to the subscriber's email inbox. One drawback of this type of service is that it requires the subscriber to have a specific telephone number associated with their email address. A second drawback is that the subscriber must distribute the personal fax telephone number to any persons who would potentially want to send a fax to the subscriber. Finally, this type of service is expensive to operate from the service provider's perspective since the costs associated with buying and operating so many individual and dedicated phone numbers is very high.

Another type of service is the service offered by UUNET, which requires a subscriber to attach additional hardware between the subscriber's fax machine and the service's network. The purpose of this service is to reduce long distance faxing costs for high volume users. The UUNET system converts a fax to the equivalent of an email and then routes the email over UUNET's network to the nearest UUFAX server. The UUFAX server converts the email back to fax format and transmits the fax using a local call to the fax machine at the destination. A drawback of this type of service is that it takes time and up-front hardware additions and expenditures to have access to the service.

SUMMARY OF THE INVENTION

Generally, the present invention comprises a facsimile/email communication system and method, whereby a user is able to send emails from any standalone facsimile machine and is also able to send facsimiles to any standalone fax machine, from either a centralized web server or a client machine connected to the Internet.

According to one aspect of the invention, a system for communicating an email from a facsimile is provided. An exemplary embodiment of this system comprises: a facsimile server configured to receive, from a start location, a facsimile in a facsimile image format, the facsimile including an email address; a character recognizer in communication with the facsimile server and configured to extract the email address; a first format converter configured to receive the facsimile and convert the facsimile to an email in an email format; an email server configured to receive the email and extracted email address and transmit the email to an end location identified by the email address; and an advertisement server configured to generate a confirmation page incorporating an advertisement on the confirmation page.

According to a second aspect of the invention, a method of communicating an email from a facsimile is provided. An exemplary embodiment of this method comprises the steps of: receiving a facsimile in a facsimile image format from a start location, the facsimile including an email address; extracting the email address from the facsimile; converting the facsimile image format to an email having an email format; and generating a confirmation page having an advertisement therein.

According to a third aspect of the invention, a system for communicating between facsimile and email is provided. An exemplary embodiment of this system comprises: a network operating center; and a plurality of geographically distributed points of presence in communication with the network operating center, each point of presence having, a facsimile server configured to receive, from a start location, a facsimile in a facsimile image format, the facsimile including an email address; a character recognizer in communication with the facsimile server and configured to extract the email address; a first format converter configured to receive the facsimile and convert the facsimile to an email in an email format; an email server configured to receive the email and extracted email address and transmit the email to an end location identified by the email address; and an advertisement server configured to generate a confirmation page incorporating an advertisement on the confirmation page.

According to a fourth aspect of the invention, a system for communicating a facsimile from an email is provided. An exemplary embodiment of this system comprises: a network operating center having a web server to which a user can log on to over the Internet to compose an email, the web server configured to capture a facsimile number contained within the email; and a plurality of geographically distributed points of presence in communication with the network operating center, each point of presence having, an email server configured to receive the email in an email format; a first format converter in communication with the email server and configured to convert it into a facsimile having a facsimile image format; an advertisement server having a return facsimile page composer and configured to generate a return facsimile page incorporating an advertisement; a second format converter configured to receive and convert the facsimile and return facsimile page to a facsimile encoded bitmap image; and a fax spooler configured to receive the facsimile encoded bitmap image and transmit it to a destination identified by the facsimile number.

According to a fifth aspect of the invention, a method of communicating a facsimile from an email is provided. An exemplary embodiment of this method comprises the steps of: logging onto a web server of a network operating center; composing an email having a facsimile number therein; capturing the facsimile number; converting the email to a facsimile; generating a return facsimile page; incorporating an advertisement in the return facsimile page; and sending the facsimile and return facsimile page to a destination identified by the facsimile number.

A further understanding of the nature and advantages of the inventions herein may be realized by reference to the remaining portions of the specification and the attached drawings.

BRIEF DESCRIPTION OF THE DRAWINGS

FIG. 4 is an exemplary illustration of an address page received from the POP of FIG. 2.

FIG. 6 is an exemplary illustration of a fax-to-email confirmation page received from the POP of FIG. 2.

DESCRIPTION OF THE SPECIFIC EMBODIMENTS

Figure 1:
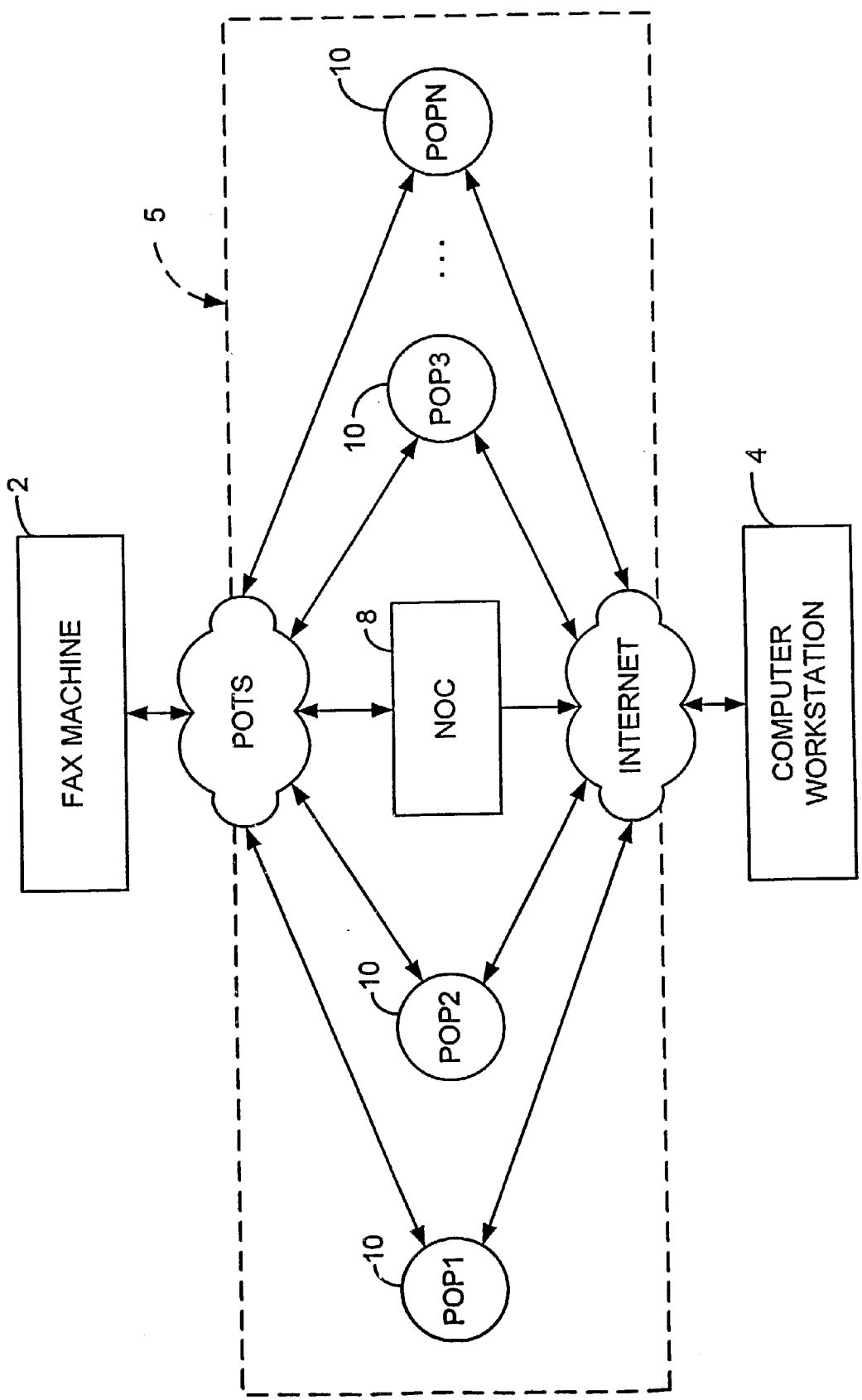
FIG. 1 is a block diagram of the system, according to an exemplary embodiment of the present invention.

FIG. 1 is a high-level block diagram of a facsimile/email communication system 5 according to one embodiment of the present invention. System 5 comprises a network operations center (NOC) 8, selectively coupled to both the Plain Old Telephone System (POTS) and the Internet, and a plurality of Points of Presence (POPs) 10 selectively coupled to NOC 8 via the POTs and the Internet. The "Internet," as meant here, means the worldwide network of networks based on the TCP/IP protocol and all means of access thereto (e.g. a local area network having an email system and being coupled to the Internet). (TCP/IP stands for "Transmission Control Protocol/Protocol" and is a language governing communication between all computers on the Internet.)

As will be explained in detail below, system 5 permits a user to, among other things, send an e-mail from any standalone fax machine 2 and receive faxes from a fax or email sender without having to distribute a unique and predefined fax number to the fax or email sender. Here, it should be emphasized that the fax machine 2, as shown in FIG. 1, is only a working example. In other words fax machine as it is used in the context of the present invention may also comprise any facsimile protocol compliant communication device. Similarly, computer workstation 4, in FIG. 1, is only a working example. In other words any device that is capable of sending an email may be used instead of computer workstation 4.

Figure 2:
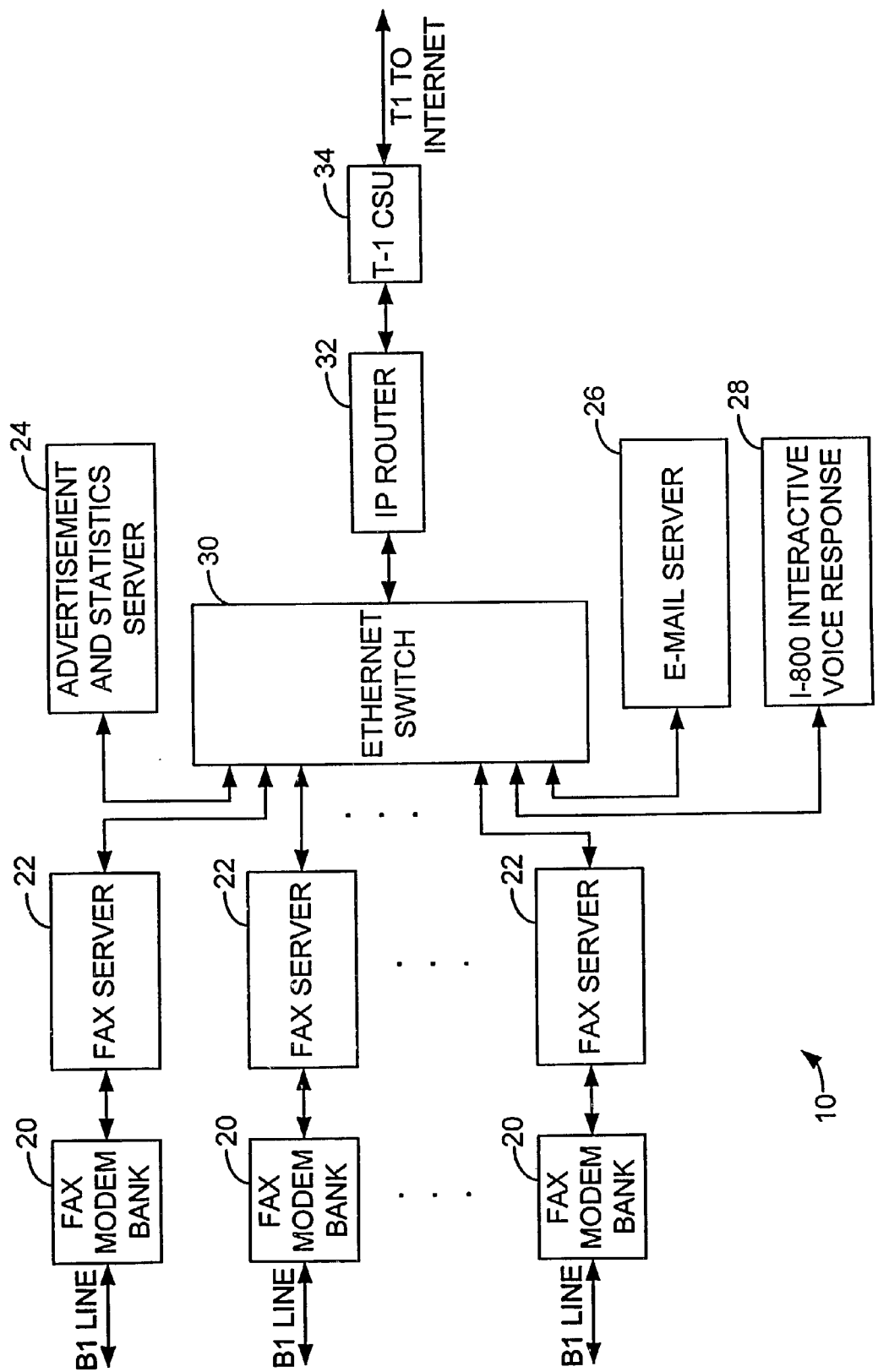
FIG. 2 is a block diagram showing a hardware configuration of a Point of Presence (POP) providing a fax/email interface according to an exemplary embodiment of the present invention.

POPs 10 are distributed over a wide geographic area, for example, the United States or throughout the world. An exemplary embodiment of a POP 10 is shown in FIG. 2. POP 10 comprises one or more fax modem banks 20; one or more fax servers 22; an advertisement and statistics (ad/stat) server 24; an email server 26; an interactive voice response (IVR) unit 28; an Ethernet switch 30; an IP router 32; and a T-1 channel service unit (CSU) 34. It should be emphasized that the embodiment of POP 10 in FIG. 2 is only exemplary. For example, other configurations are within the spirit and scope of the present invention, including but not limited to use of higher-capacity Internet access lines (e.g. T-3), provision for multiple switched email servers, etc. FIGS. 1 and 2 will be described in further detail in the context of the description presented below.

Figure 3A:
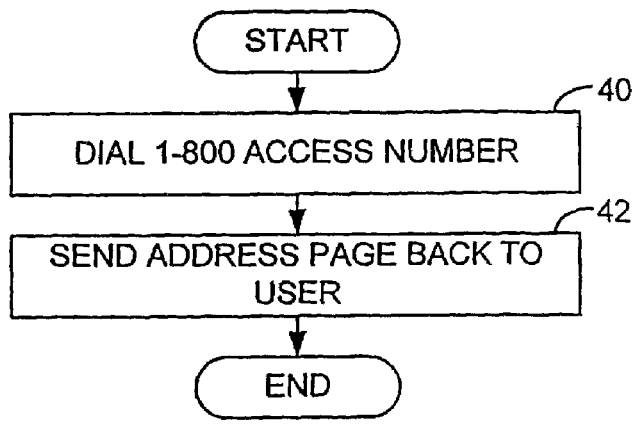
FIG. 3A is an illustration of a process of obtaining an address page, according to an exemplary embodiment of the present invention.

Referring now to FIG. 3A, there is shown an illustration of how a user obtains an "address page" from a fax server 22, according to an exemplary embodiment of the present invention. At step 40, the user dials a specific toll-free (e.g. 1-800) fax-back number from any fax machine or telephone. This fax-back number is routed by the telephone network via the POTS to a POP 10, based on the user's geographic locale. As shown in FIG. 2, fax modem bank 20 of POP 10 receives the fax over, for example, a B-1 line, which comprises 24-line telephone bundle. Then, at step 42, POP 10 sends a blank email "address page" back to the user with further instructions on how to send an email from the user's fax machine.

The email address page looks like a normal fax cover sheet, but it contains lines of blank character boxes and a local telephone number the user can use so that the fax can be sent without the user having to incur any cost. The local telephone number is generated by a table driven translation process through automatic number identification, detectable from outbound 1-800 numbers. In an alternative embodiment each POP 10 of system 5 would be accessible using a single toll-free number. An exemplary email address page is shown in FIG. 4. In one embodiment the character boxes 61 have "tickmarks" 63 on the edges of each character box 61. Tickmarks 63 have the effect of coercing the user to enter characters in the character boxes 61 but away from the character box edges. Characters entered away from the character box edges is beneficial, since later in the process, when character recognition is performed, the characters can be identified more accurately. In addition, the email address page may include additional information, such as, instructions on how to complete the email address page. The email address page may further include check boxes to allow the user to request certain types of information including, for example, traffic and weather, map, movies and restaurants, etc.

Figure 3B:
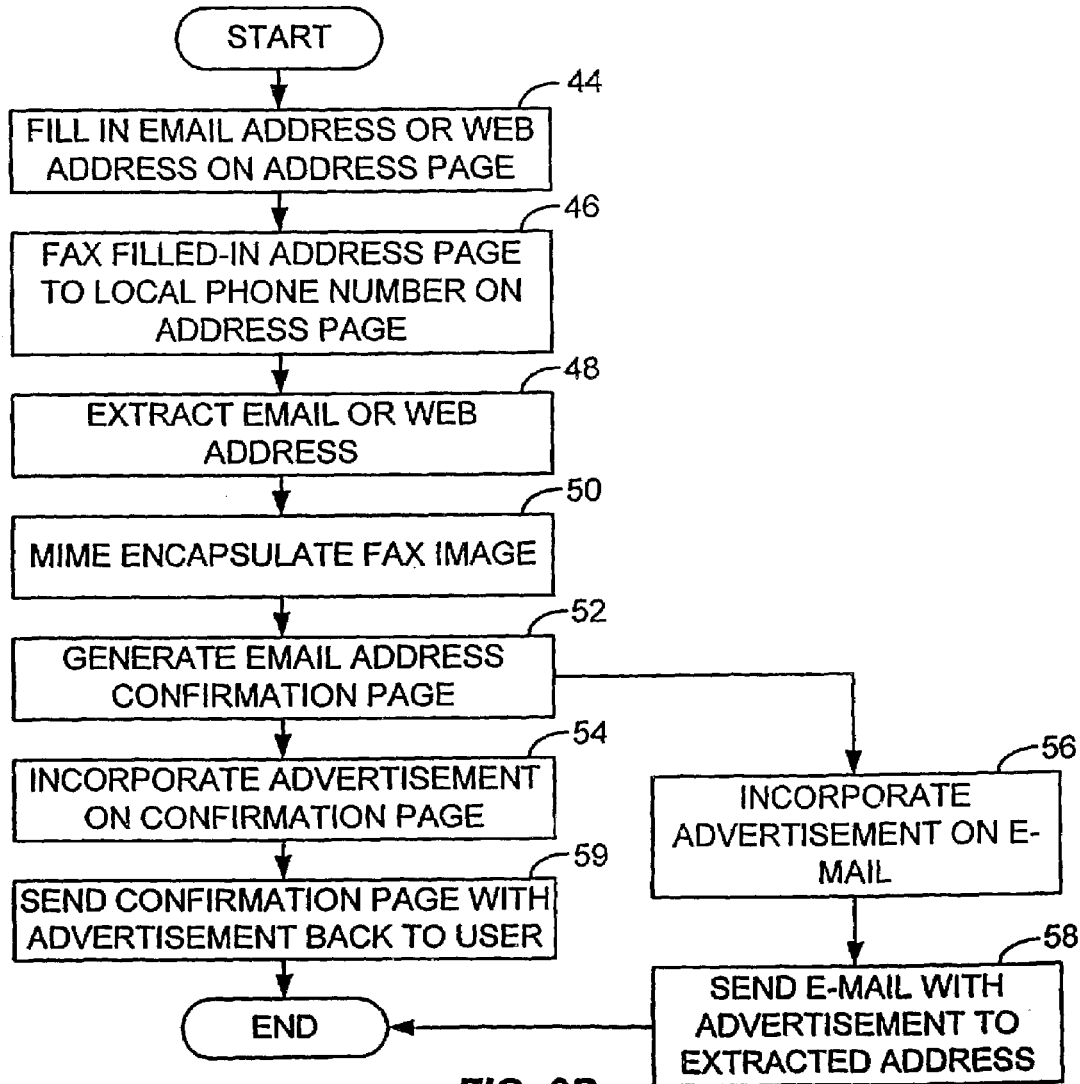
FIG. 3B is an illustration of a process of a user interacting with the system of the present invention to send an email from a fax machine, according to an exemplary embodiment of the present invention.

Referring now to FIG. 3B, there is shown an illustration of how a user interacts with the system 5 of the present invention to send an email from a fax machine, 2 according to an exemplary embodiment of the present invention. At step 44, the user fills in the letterboxes, in normal handwriting, with the final email address(es) it wishes to send to, e.g., "john_doe@generic.com". Alternatively, the email address can be printed in a machine-readable format. In an alternative embodiment, the email address page includes an "advanced features page," which can be downloaded to the user's fax so that the user can create a group distribution list.

At step 46, the user sends the fax to the local number of the selected POP 10, where it is received by a fax modem bank 20 on fax server 22. Fax modem bank 20 includes an incoming fax spooler 60, which converts the fax to an image file format, which may be, for example the standard G3 TIFF format and then temporarily stores the imaged fax in a spool area on a local disk drive (not shown in the figures). The imaged email address page is then transmitted to one of the fax servers 22 of POP 10 for further processing.

Figure 5:
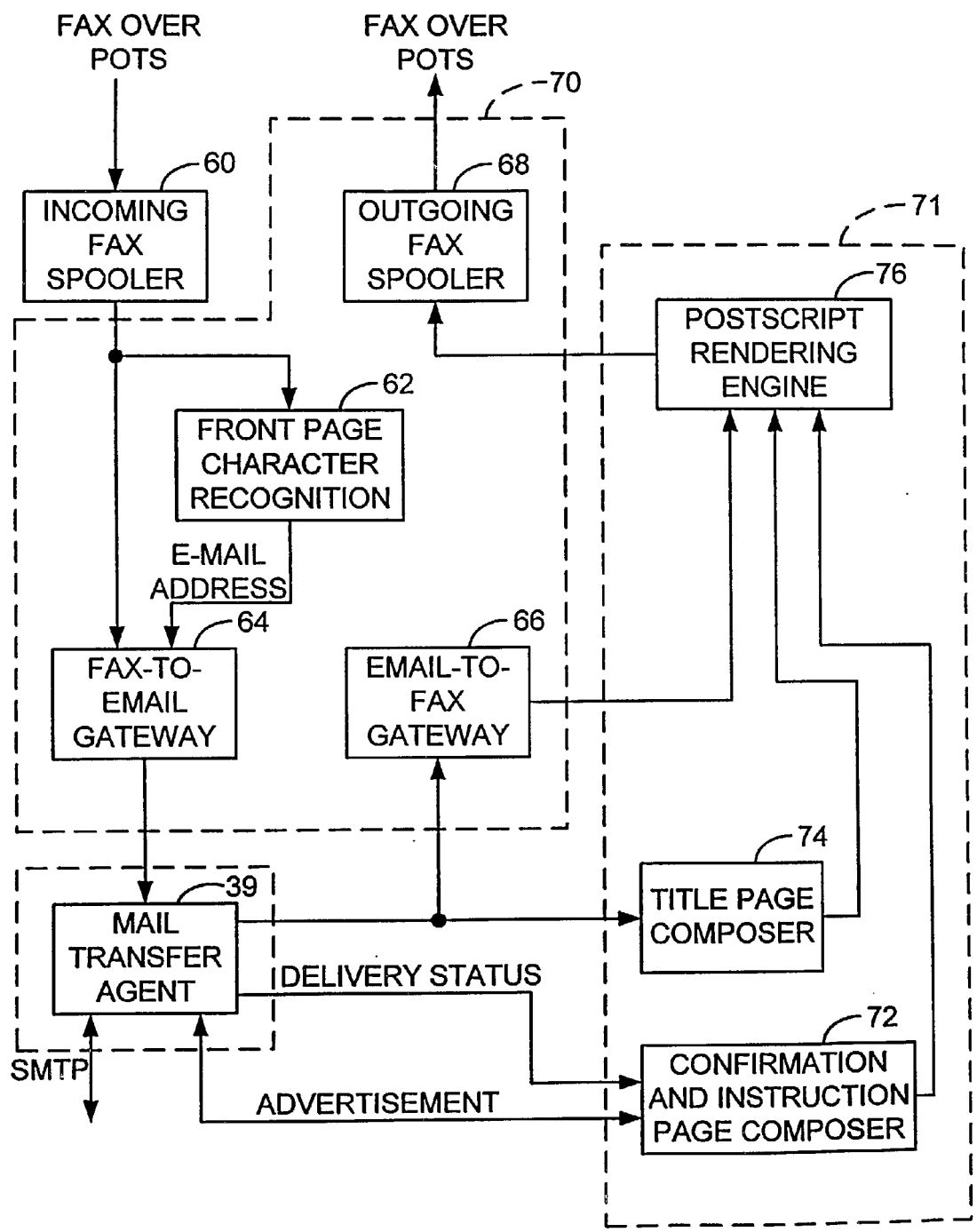
FIG. 5 is a block diagram showing the software architecture of the POP of FIG. 2.

In addition to fax spooler 60, and as is shown in FIG. 5, the software architecture 70 for each fax server 22 comprises a front page (i.e. address page) character recognition module 62, a fax-to-email gateway 64, a email-to-fax gateway 66 and an outgoing fax spooler 68.

At step 48, front page character recognition module 62 operates to extract the imaged email address from the imaged email address page. Preferably, front page character recognition module 62 does this by optical character recognition (OCR).

At step 50, the electronic image of the fax is encapsulated and formatted into a MIME-compliant email message by fax-to-email gateway 64. "MIME" stands for Multipurpose Internet Mail Extensions and refers to an official Internet standard that specifies how email messages must be formatted so that they can be exchanged between different email systems. The electronic image of the fax is then transmitted to email server 26 as an attachment to the email.

Upon receipt of the fax image by email server 26, email server 26 transmits the delivery status of the email to advertisement and statistics server (ad/stat server) 24. As shown in FIG. 5, the software architecture 71 of ad/stat server 24 comprises a confirmation and instruction page composer 72, a title page composer 74 and a PostScript rendering engine 76. Confirmation and instruction page composer 72 receives the delivery status of the email from email server 26 and subsequently generates delivery or non-delivery notifications and user instruction pages in PostScript format.

At step 52, confirmation and instruction page composer 72 generates a confirmation and instruction page, and, at step 54, retrieves advertisements from ad/stat server 24 and incorporates the advertisements into the confirmation and instruction page. Additionally, at step 56, confirmation and instruction page composer 72 retrieves advertisements from ad/stat server 24, which are incorporated, e.g. in banner format into the email. Preferably, the advertisements incorporated in the confirmation and instruction page are specifically targeted to the user's geographic locale. The system 5 determines the user's geographic locale from the user's fax number's prefix and area code and advertisements are then targeted based on demographic data characteristic of the user's neighborhood, e.g., average income bracket. In an alternative embodiment, the email address confirmation page includes an electronic commerce aspect, wherein the user is provided with a "check box" on the confirmation and instruction page, which the user can check to indicate further interest in a particular advertising offer. An exemplary embodiment of a confirmation and instruction page is shown in FIG. 6.

In yet another alternative embodiment, a toll-based (e.g. 1-900) number is provided to the user at the beginning of the process, i.e., in lieu of step 10 in FIG. 3A, to provide a user with the option between the free advertising subsidized service described above or a pay-per-use service where the confirmation and instruction page does not incorporate advertisements.

After the confirmation and instruction page has been composed, it is rasterized into a fax encoded bitmap image by PostScript rendering engine 76 and then sent to fax server 22 where outgoing fax spooler 68 operates to store the rasterized confirmation and instruction page on a local disk drive for subsequent delivery. Because bitmap image rendering is a computationally intensive process, a custom load-sharing software for distributing the rasterization process between a number of fax servers 22 machines may be employed as an alternative embodiment.

At steps 58, the email (with the advertisements) is sent over the Internet to the intended recipient using, for example, SMTP protocol, and as an attachment in a standard format, e.g. GIF file, viewable on the majority of platforms.

Finally, at step 59, the confirmation and instruction page is sent over the POTS to the user, the confirmation and instruction page incorporating an advertisement as explained above.

At this point, it should be emphasized that, whereas the software modules of the software architecture of FIG. 5 are shown to be distributed over multiple servers, one skilled in the art would understand that all the software modules could reside on a single server or on different servers than is shown in the embodiment of FIG. 5.

In an alternative embodiment, a user can interact with the system of the present invention to send a facsimile from any standalone facsimile machine to any other standalone facsimile machine. To do this, the user procures a "facsimile number page," as for example, similar to procuring the "email address page" described above in relation to steps 40 and 42. The user then enters a facsimile number of the intended facsimile recipient, for example, in handwritten format or printed machine readable format, and then faxes the facsimile to the local number of the selected POP 10 as in steps 44 and 46 described above (or, alternative, enters a pay-per-use toll-based number as is also described above). Upon receipt of the facsimile by the selected POP 10, the facsimile number is then extracted and the electronic image of the facsimile is formatted into a MIME-compliant email message by fax-to-email gateway 64, similar to steps 48 and 50 above. Next, email server 26 transmits the MIME image to an email-to-fax gateway 66, which could reside on a different POP 10, where the email-to-fax gateway 66 converts the MIME image into a text-formatted (e.g. PostScript) file. Then, PostScript rendering engine 96 operates to rasterize the text-formatted file into a fax encoded bit map image. And, finally, outgoing fax spooler 68 receives the fax encoded bit map image and transmits it to the intended facsimile recipient.

In yet another embodiment of the present invention, webpages can be downloaded via fax. In this embodiment, a user is provided with an "address page" as described above. This address page provides letterboxes for entering the desired web address (which, for example can be entered in normal handwriting or printed in a machine readable format) and an indicator of some sort, which the user can use to request the number of pages from the web address the user wishes to download. One type of indicator on the address page, for example, could be a series of bubbles positioned at predetermined positions on the address page.

Figure 7:
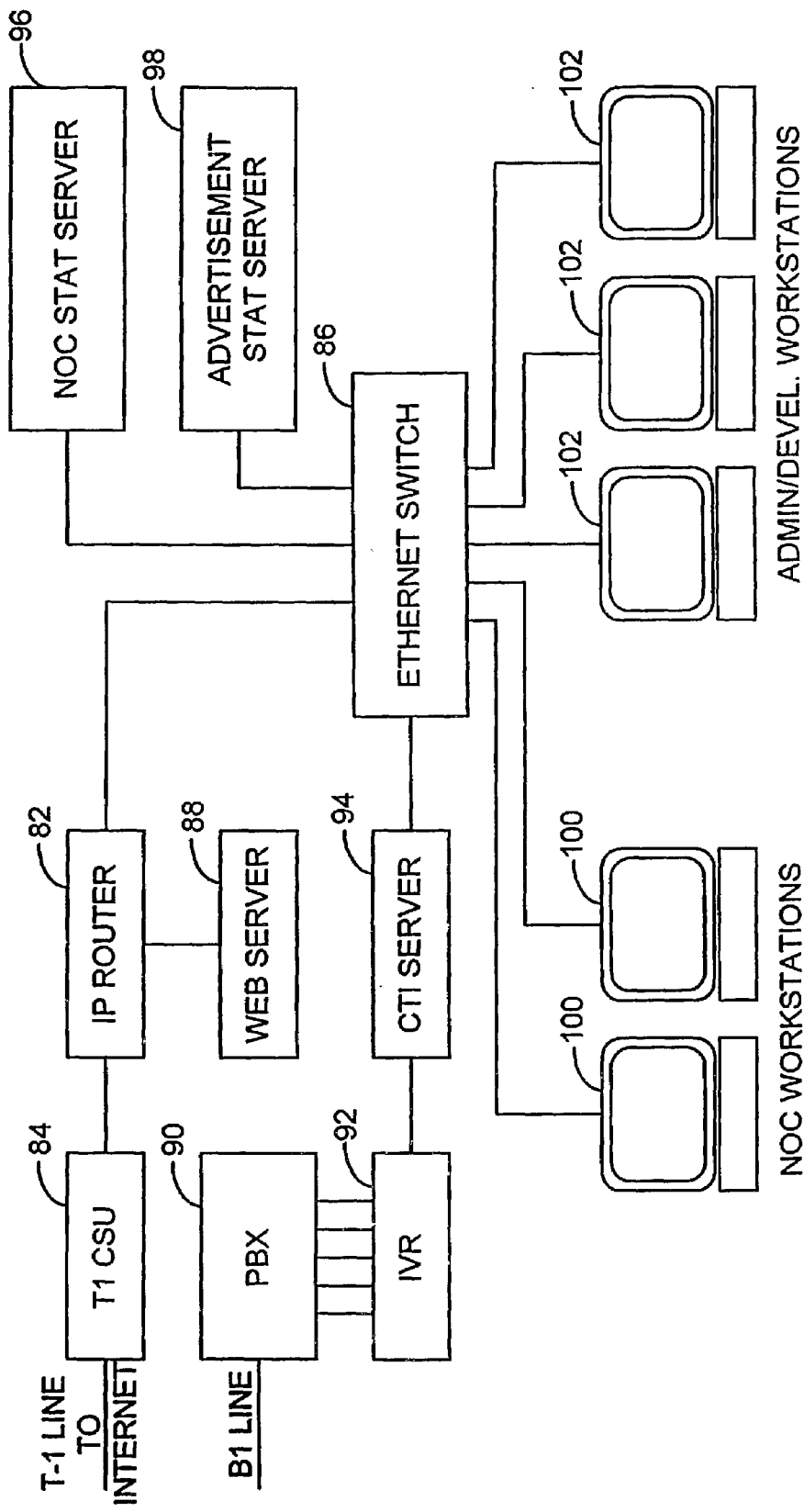
FIG. 7 is a block diagram of a network operations center (NOC).

Referring now to FIG. 7, there is shown a network operations center (NOC) 8, according to an exemplary embodiment of the present invention. NOC 8 functions as the system headquarters and is configured to communicate with all POPs 10, as was shown and described in reference to FIG. 1. NOC 8 comprises an Internet access router and firewall component (IP router) 82 coupled between the Internet via, for example, a T1 channel service unit (CSU) 84 and an Ethernet switch 86 (at a data rate of, for example, 100 Mbps); a web server 88 coupled to IP router 82; a private branch exchange (PBX) 90 coupled to the telephone network via, for example, a B-1 line; an interactive voice response (IVR) unit 92 coupled to PBX 90 and a computer-telephony integrated (CTI) server 94 coupled between IVR unit 92 and Ethernet switch 86. Also coupled to Ethernet switch 86 is an NOC statistics server 96; an NOC advertisement statistics server 98; NOC workstations 100; and administrative/development workstations 102.

NOC advertisement statistics server 98 stores, and makes available to advertisers, statistics relating to the advertiser's advertisement(s), for example, the number of times the advertisement was sent, the number of positive responses from viewers of the advertisement, etc.

NOC administrative/development workstations function as a help desk to those users who log on to web server 88 and also allow the system provider to do development, for example, improving the functionality of the web site provided by web server 88.

IVR unit 92 permits a user to dial into the NOC via PBX 90 using the same 1-800 toll free access number used in the initiation of a fax-to-email process described above. IVR 92 provides user's with voice prompts, which the user can respond to using the telephone keypad. The prompts may relate to, for example, use instructions or may permit a user to download information from the Internet, e.g. stock quotes, weather predictions, travel information, etc.

Figure 8A:
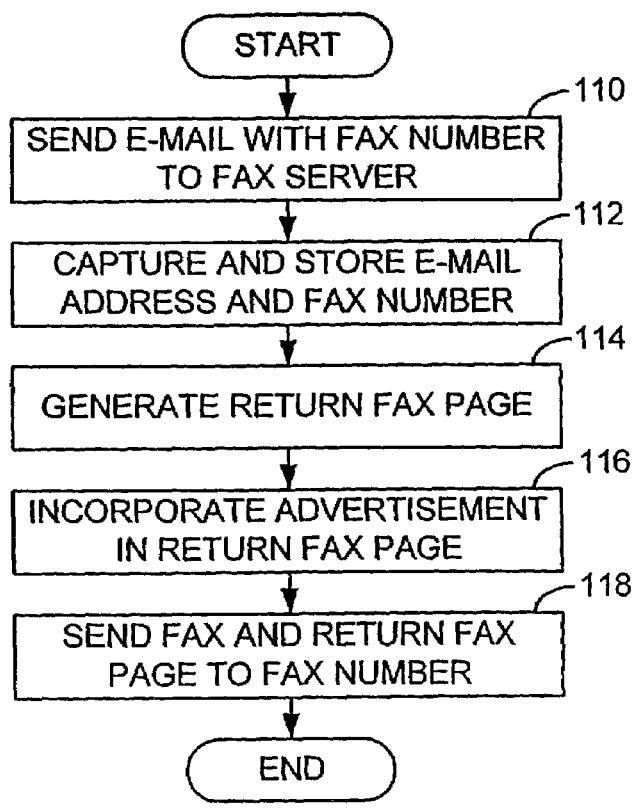
FIG. 8A is an illustration of a process of a user interacting with the system of the present invention to send a fax from an email, according to an exemplary embodiment of the present invention.

In another embodiment of the present invention, a user can logon to web server 88 from, for example, a computer workstation 4 (See FIG. 1), and then send a fax from an email to any standalone fax machine. An exemplary process for accomplishing this is shown in FIG. 8A.

At step 110, after the user logs on to web server 88 (See FIG. 7), the user sends an email to web server 88. Then, at step 112, web server 88 captures and stores the user's email address and the fax number to which the user wishes to send the fax. This information is relayed over the Internet to email server 26 of the, preferably, nearest POP 10, to which the fax number is associated. As shown in FIG. 5, each email server 26 contains a mail transfer agent 39, which accepts the email from NOC 8. Email-to-fax gateway 66 then operates to convert the email message into PostScript text.

At step 114 title page composer 74 generates a return fax page, and, at step 116 retrieves advertisements from ad/stat server 24 and incorporates the advertisements into the return fax page. Preferably, the advertisements are specifically targeted to the fax recipient's location. The system 5 determines this from the recipient's fax number's prefix and area code by comparing the numbers to area code and prefix numbers stored in ad/stat server 24. Once the neighborhood is identified, advertisements are then targeted based on demographic data characteristic of the recipient's neighborhood, e.g., average income bracket. In an alternative embodiment, the return fax page includes an electronic commerce aspect, wherein the fax recipient is provided with a "check box" on the return fax page, which the recipient can check to indicate further interest in a particular advertising offer.

After the return fax page has been composed, it and the converted fax image are rasterized into a fax encoded bitmap image by PostScript rendering engine 76 and then sent to a fax modem bank 20 of POP 10 where outgoing fax spooler 68 operates to store the rasterized fax and return fax page on a local disk drive for subsequent delivery.

At step 118, the fax and return fax page are sent over the POTS to the fax recipient.

Figure 8B:
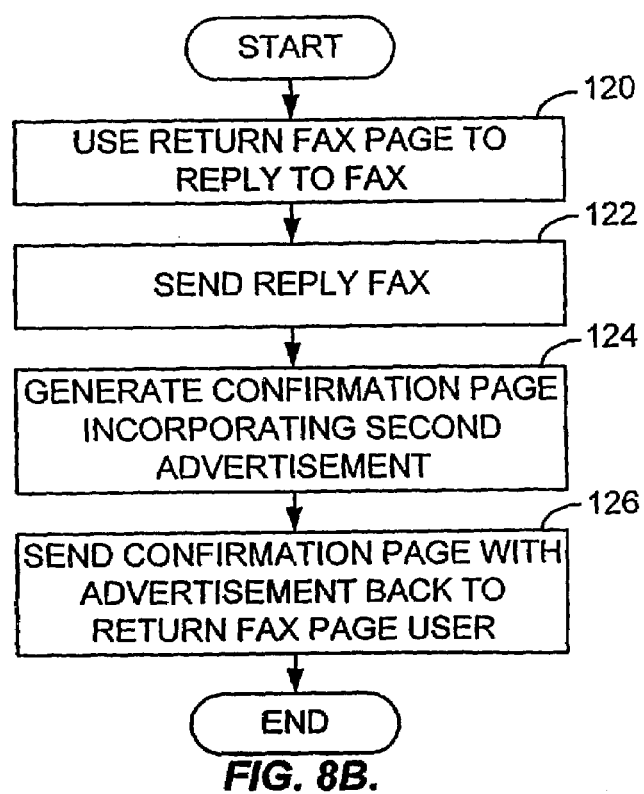
FIG. 8B is an illustration of a reply process wherein a recipient of the fax, delivered in the process according to FIG. 8A, replies to the fax using a return fax page.

Referring now to FIG. 8B, at step 120, upon receipt of the fax and return fax page, the fax recipient uses the return fax page to reply to the fax and sends the reply fax at step 122.

At step 124, title page composer 74 of ad/stat server 24 operates to generate a confirmation page incorporating a second advertisement, which is then, at step 126, sent back to the return fax page user. Steps 124 and 126 substantially follow the steps 54 and 59 as described in reference to the fax-to-email process of FIG. 3B.

The advertising subsidized aspect of the system and method of the present invention also allows a user to send a fax from any standalone fax machine to any other standalone fax machine for free, thereby avoiding long distance telephone charges, which are typically billed for any long-distance fax transmission. To accomplish this, a user simply dials the toll free (1-800) access number, as explained above, to obtain a local number to a POP 10. Local POP 10 then responds by faxing back an address page to the user. Steps 44 through 48 are then performed, as was described in relation to FIG. 3B, followed by steps 110 through 118 as was described previously in relation to FIG. 8A. The only difference from the process as described above would be to provide letterboxes for fax addresses on the address page and provide for OCR capability for extracting fax addresses.

In another alternative embodiment of the present invention, NOC 8 includes a local database (not shown in FIG. 7), which is configured to store a frequent user's email address book. The user can logon to web server 88, upload the address book and associate nicknames or real names with each email address (e.g. "John Doe" for john_doe@generic.com). By doing this, the user can then send emails from any standalone fax machine simply by filling in the letterboxes of the address page (as described previously with respect to FIG. 3B) with the nickname or real name of the intended recipient.

Finally, in another exemplary embodiment of the present invention, advertisers are provided with a "dynamic print advertising" service, whereby an advertiser can logon to web server 88 of NOC 8, open an account, create advertisements and customize them based on specific demographic information.

In summary, the method and apparatus of the present invention permits a user to, among other things, send an e-mail from any standalone fax machine; receive a fax from another without requiring the user to have previously procured and distributed a unique and predefined fax number; and send a fax from an email by logging onto a web server provided by a centralized operating center.

Although the invention has been described in terms of preferred methods and structure, it will be obvious to those skilled in the art that many modifications and alterations may be made to the disclosed embodiments without departing from the invention. Hence, these modifications and alterations are intended to be considered as within the spirit and scope of the invention as defined by the appended claims.

What is claimed is:

1. A system for communicating a facsimile or scanned image to an email destination from a communication device, comprising:
   a first server configured to receive, from the communication device, the facsimile or the scanned image, the facsimile or scanned image including an optical representation of an email address that references the email destination;
   an optical character recognizer in communication with the first server and configured to optically extract the email address from the facsimile or scanned image;
   a first converter configured to receive and convert the facsimile or scanned image to an email attachment for transport over an email system; and
   a second server configured to form an e-mail message in response to the email attachment and the email address, and to transmit the email message to the email destination, wherein a body of the email message includes a service provider advertisement.

2. The system of claim 1, wherein the communication device comprises a facsimile machine.

3. The system of claim 2, wherein the facsimile machine is configured to receive a hard copy of the facsimile, the hard copy having a cover page including the optical representation of the email address positioned at a predetermined location on the cover page.

4. The system of claim 3, wherein the cover page also includes a facsimile number to which the facsimile or scanned image is delivered to the first server.

5. The system of claim 4, wherein the facsimile number comprises a pay-per-use number.

6. The system of claim 4, wherein the facsimile number comprises a toll-free number.

7. The system of claim 1 further comprising a third server in communication with the second server, wherein the third server is configured to receive a delivery status from the second server.

8. The system of claim 7, wherein the third server includes a confirmation page composer configured to generate a confirmation page.

9. The system of claim 8, wherein the confirmation page composer is configured to receive the delivery status and generate delivery and non-delivery notifications.

10. The system of claim 9, wherein the first server is further configured to receive the delivery and non-delivery notifications in facsimile format for transmission to the communication device.

11. The system of claim 8, wherein the service provider advertisement comprises a company name.

12. The system of claim 11, wherein the first server is configured to receive the confirmation page in facsimile format for transmission to the communication device.

13. The system of claim 11, wherein the service provider advertisement is retrieved based on information associated with a sender of the facsimile or scanned image.

14. The system of claim 13, wherein the information associated with the sender includes demographic information.

15. The system of claim 7, wherein the third server is further configured to store advertising statistics.

16. The system of claim 7, wherein the third server is further configured to provide the service provider advertisement to the second server for incorporation into the email.

17. The system of claim 16, wherein the third server is further configured to maintain a plurality of advertisements created by an advertiser and select the advertisement to be provided to the second server from the plurality of advertisements using information associated with the email.

18. The system of claim 1, wherein the optical character recognizer extracts the email address by optical character recognition of hand-entered characters.

19. The system of claim 1, wherein the email address is handwritten.

20. The system of claim 1, wherein the email address is printed in a machine readable format.

* * * * *